April 12, 1966   F. J. SCHRAMEL ET AL   3,246,298
APPARATUS FOR RECEIVING MESSAGES AND TRANSMITTING THEM
IN CERTAIN OF A NUMBER OF DIRECTIONS
Filed Dec. 12, 1960   5 Sheets-Sheet 1

INVENTOR
FRANZ J. SCHRAMEL
*HANS KOK*
BY
AGENT

April 12, 1966 F. J. SCHRAMEL ET AL 3,246,298
APPARATUS FOR RECEIVING MESSAGES AND TRANSMITTING THEM
IN CERTAIN OF A NUMBER OF DIRECTIONS
Filed Dec. 12, 1960 5 Sheets-Sheet 2

INVENTOR
FRANZ J. SCHRAMEL
HANS KOK
BY
AGENT

INVENTOR
FRANZ J. SCHRAMEL
HANS KOK
BY
AGENT

United States Patent Office 3,246,298
Patented Apr. 12, 1966

3,246,298
APPARATUS FOR RECEIVING MESSAGES AND TRANSMITTING THEM IN CERTAIN OF A NUMBER OF DIRECTIONS
Franz Josef Schramel and Hans Kok, Hilversum, Netherlands, assignors to North American Philips Company, Inc., New York, N.Y., a corporation of Delaware
Filed Dec. 12, 1960, Ser. No. 75,366
Claims priority, application Netherlands, Dec. 19, 1959, 246,608
8 Claims. (Cl. 340—172.5)

The invention relates to apparatus for receiving messages and transmitting them in certain of a number of directions, the directions in which a message has to be transmitted being determined by an address provided in coded digital form at the beginning of said message. Such apparatus is particularly required in telegraph exchanges, in which event the information to be transmitted is of digital nature. However, the invention is not limited to a particular nature of the information to be transmitted. The information constituting the address of a message to be transmitted, however, will always be digital. It is an object of the invention to cause the messages to be transmitted automatically as far as possible and thus to increase the speed of the transport of the information. According to the invention, this object is attained in that the apparatus includes a delay member to which the information constituting the message is supplied and which passes on this information with a time delay to a number of gates giving access to the directions concerned, the information being also supplied to an address analyser which from the address provided at the beginning of a message derives a number of signals which are applied to the gates to be opened so that they are actually opened, whereupon the address analyser renders itself unresponsive to the handling of further information whilst furthermore the delay of the delay member has a value such that this member only passes information to the gates when the address analyser has completely analysed the address and opened the gates concerned. The addresses of the various messages may be of unequal length. In this event, it is of advantage for the delay member to have a variable delay and to be designed so that it begins to transmit the information stored in it after the reception of a signal produced by the address analyser as soon as an address has been completely analysed. Thus, the delay in the transmission caused by the apparatus is restricted to a minimum.

An embodiment of the invention will now be described more fully by way of example with reference to the drawing.

Figure 1:
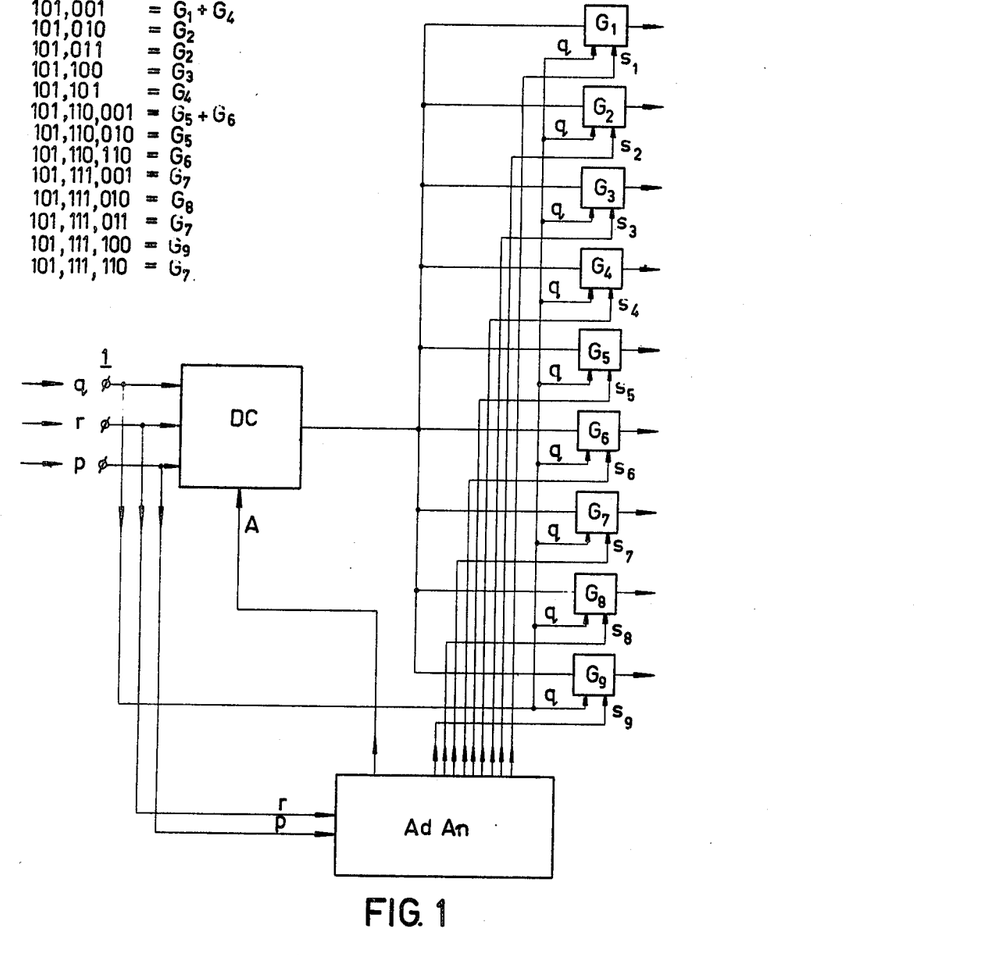
FIG. 1 shows the block diagram of an apparatus in accordance with the invention.

FIG. 1 is a circuit diagram of the fundamental structure of an apparatus in accordance with the invention. In this figure, reference numeral 1 denotes a set of terminals through which the messages come in. Each message comprises a pulse $p$ containing the information "A new message begins," a number of pulse code groups $r$ constituting the message proper including the address, and a pulse $q$ containing the information "The message it terminated." It is assumed that the pulse groups $r$ are offered in parallel so that the terminal relating to the information $r$ in actual fact is a group of $n$ terminals when the code groups each contain $n$ code elements. It is further assumed that the system is designed so that the arrival of a message is preceded by a pulse $p$ at an instant which will hereinafter be referred to as the instant $t_0$ and which may be one of the last instants of regularly recurring pulse cycles. Subsequently, at instants $t_1$ of the next pulse cycles, the successive code groups $r$ of the message are received and after the reception of the last code group of the message, for example at a subsequent instant of the pulse cycle in which this last code group occurs, the pulse $q$ is received. The pulses $p$ and $q$ consequently have the function of control pulses accompanying the message. The invention is independent of the manner in which the pulses $p$ and $q$ are produced. The message may initially be received sequentially and each message may begin with a fixed code group. In this event, the code groups received in sequence must first be converted in known manner to code groups offered in parallel. Furthermore, a member may be provided which detects the fixed code group and upon detection of this code group produces the signal $p$. The detection of the said fixed code group may be effected in known manner either before or after the parallelization of the code groups. If the detection device is designed so that after the detection of the beginning of a new message it is rendered insensitive for the remainder of the duration of the message, the said fixed code group may be used for other purposes in the remainder of the message. However, it must be ensured that the signal $p$ occurs shortly before the first code group of each message offered in parallel and hence the code groups may possibly have to be slightly delayed in a storing device. In a similar manner, the arrangement may be such that each message ends in another fixed code group, for example the code group (00 . . . 0). From this code group the signal $q$ may be derived. This second fixed code group, however, cannot be used for other purposes. Since the invention is independent of the manner in which the signals $p$ and $q$ are produced, the simplest thing is to assume that these signals are transmitted as accompanying control signals through separate leads, and this may actually be the case.

In FIG. 1, DC denotes a delay member, $G_1, G_2 \ldots G_9$ are gates and A$d$A$n$ denotes an address analyser. It is assumed that each message begins with the code group (101) which carries the information "A new message begins" and from which the pulse $p$ may already have been derived. This code group contains no information about the address proper, that is to say, about the gates $G_1$ to be opened. For simplifying the language, however, this code group will hereinafter be considered as forming part of the address of the message. One or two code groups then follow which together indicate which of the gates $G_1$ must be opened. Thus, the entire address comprises two or three code groups. In the upper left hand corner of FIG. 1 are shown the addresses the messages can have and the gates to be opened for each address. Thus, the formula 101,001=$G_1$+$G_4$, for example, means that, when the message begins with the code group (101) followed by the code group (001), the transfer gates $G_1$ and $G_4$ have to be opened. The remaining formulae must be interpreted similarly. In the example described, the address has a veriable length since it may comprise either two or three code groups.

The apparatus operates as follows. The pulse $p$ and the code groups $r$ are supplied to the delay member DC and to the address analyser A$d$A$n$. The pulse $p$ prepares these members for the reception of the code groups $r$. The code groups $r$ received in sequence are delayed in the delay member DC for a time interval to be determined later on. The address analyser, which also receives these code groups, receives as the first code group the code group (101), but does not respond thereto, since this code group contains no indication of the gates to be opened. However, if one of the code groups (001), (010), (011), (100) or (101) is then received, it is determined which of the transfer gates $G_i$ must be opened. The relevant gates $G_i$ are opened by pulses $s_i$ supplied to them by the address analyser. If, for example, the second code group is (011), the address analyser delivers a pulse $s_2$ which opens the transfer gate $G_2$ in agreement with the formula $101,011=G_2$. The address analyser A$d$A$n$ also supplies a signal A (which may be a pulse) to the delay member DC which responds to thiis signal by sending out the code groups in the order of reception. These code groups which together constitute the message are then passed on in the desired direction by the gate $G_2$ which has been opened in the meantime. Furthermore, the address analyser renders itself insensitive to the reception and handling of the further code groups of the message.

If, however, the second code group received is (110) or (111), the address analyser A$d$A$n$ is not yet allowed to render itself irresponsive since then the third code group only shows which of the gates $G_i$ have to be opened. Neither is it allowed for a signal A to be supplied to the delay member DC since this would then send out the first code group (101). Since, however, all the transfer gates $G_i$ are still closed, this code group has nowhere to go and consequently would be lost. The address analyser A$d$A$n$ now also receives and analyses the third code group. If, for example, the code groups (101), (110) and (001) are received in sequence, the address analyser supplies a signal $s_5$ to the gate $G_5$, a signal $s_6$ to the gate $G_6$ and a signal A to the delay member DC. As a result, the latter begins to send out the code groups in the order of reception and hence these code groups are passed on in the desired directions by the gates $G_5$ and $G_6$ which are opened in the meantime. After having transmitted the signals $s_5$, $s_6$ and A, the address analyser A$d$A$n$ has again rendered itself insensitive.

When the complete message has been transmitted, the delay member DC and all the gates $G_i$ receive the signal $q$. The delay member DC responds to this signal by stopping as a preparation for returning to the initial condition on reception of a new signal $p$. The gates $G_i$ which are open respond by closing. Thus, the apparatus is again fully prepared to transmit a following message in the desired direction or directions.

As will be seen from the above, the signal $q$ has to be received when the last code group of the message has been transmitted by the delay member DC. Hence, if the signal is derived from a specified fixed code group, for example the code group (00 . . . 0), the relevant detection device may be connected after the delay member DC.

Figures 2, 3, 4, 5, 6:
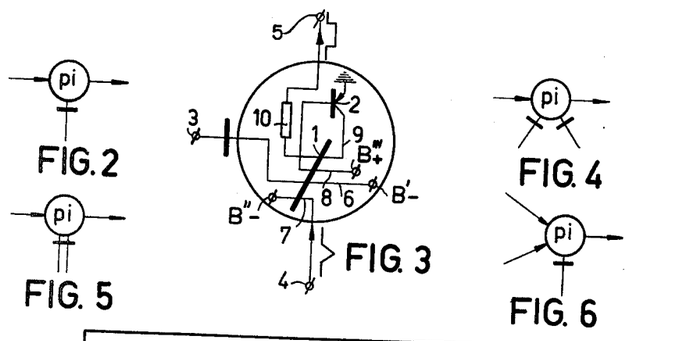
FIG. 2 shows the symbol for a very useful component used in apparatus in accordance with the invention.
FIG. 3 shows the circuit arrangement of the component shown in FIG. 2.
FIGS. 4, 5 and 6 show the symbols for three special embodiments of the said component.

A highly useful component for building up the apparatus in accordance with the invention is the storing pulse generator the symbol for which is shown in FIG. 2 and the circuit diagram of which is shown in FIG. 3. The term "storing generator" is used herein to mean a circuit having a cocking terminal (indicated in FIG. 2 by a cross-line), a firing terminal (shown in FIG. 2 as an arrow pointing to the circle representing the pulse generator) and an output terminal (shown in FIG. 2 by an arrow pointing away from the circle representing the pulse generator). The pulse generator only delivers an output pulse if first a pulse of sufficient strength and a certain polarity is supplied to the cocking terminal (cocking the pulse generator) and then a pulse of sufficient strength and a certain polarity is supplied to the firing terminal (firing the pulse generator). Thus, a storing pulse generator which has not been previously cocked or has already been fired does not deliver an output pulse when fired.

FIG. 3 shows the circuit diagram of a possible embodiment of a storing pulse generator having as the storage element a ring 1 of a material having a rectangular hysteresis loop so that the pulse generator has an infinitely long memory. Further reference numeral 2 denotes a pnp-transistor, 3 a cocking terminal, 4 a firing terminal and 5 an output terminal. The cocking terminal 3 is connected through a cocking winding 6 on the ring 1 to a negative voltage source B'$_-$, the firing terminal 4 is connected through a firing terminal 7 to a negative voltage source B'''$_+$, and the output terminal 5 is connected through an output winding 9 and, as the case may be, a current-limiting resistor 10 connected in series therewith, to the collector of the transistor 2. The base of this transistor is connected through a control winding 8 to a positive voltage source B'''$_+$ and the emitter of the transistor is connected to earth. The winding senses of the various windings are shown by the manners in which the lines representing these windings intersect the heavy line representing the ring 1.

The circuit arrangement operates as follows. Normally, the transistor is closed by the positive bias voltage applied to its base. When a pulse is applied to the cocking terminal 3, the ring 1 is set to a magnetic condition referred to as the state 1. The voltage induced as a result in the control winding 8 drives the base of the transistor temporarily further positive than it was and thus has no effect on the transistor. If a pulse is then applied to the firing terminal 4, the ring 1 begins to shift to the state 0 so that a voltage is induced in the control winding 8 which overcomes the voltage of the source B'''$_+$ and hence drives the base of the transistor 2 negative. As a result, the transistor is rendered conducting so that it passes a current which reaches the output terminal 5 through the output winding 9. The current flowing through the output winding 9 is capable of taking over the action of the current flowing through the firing winding 7 so that a voltage driving the base of the transistor 2 negative continues to be induced in the control winding 8 and the transistor 2 remains conducting up to the instant at which the ring 1 has completely flipped over and has reached the state 0. Suitable proportioning enables a substantially rectangular output pulse of sharply defined amplitude and duration to be produced by a short firing pulse.

It will be appreciated that the storing pulse generator just described may alternatively be provided with two or more cocking terminals each connected to a separate cocking winding. The number of turns of the cocking windings may be chosen so that the pulse generator is set to the cocked condition when a pulse is applied to any one of the cocking terminals (symbol FIG. 4) but also so that the pulse generator is only set to the cocked condition if a pulse is applied to two cocking terminals (coincident cocking; symbol FIG. 5). In the first case (FIG. 4), the cocking terminals are referred to as non-coupled and in the second case as coupled. The pulse generator may alternatively be provided with two or more firing terminals each connected to an individual firing winding (symbol FIG. 6).

Figure 7:
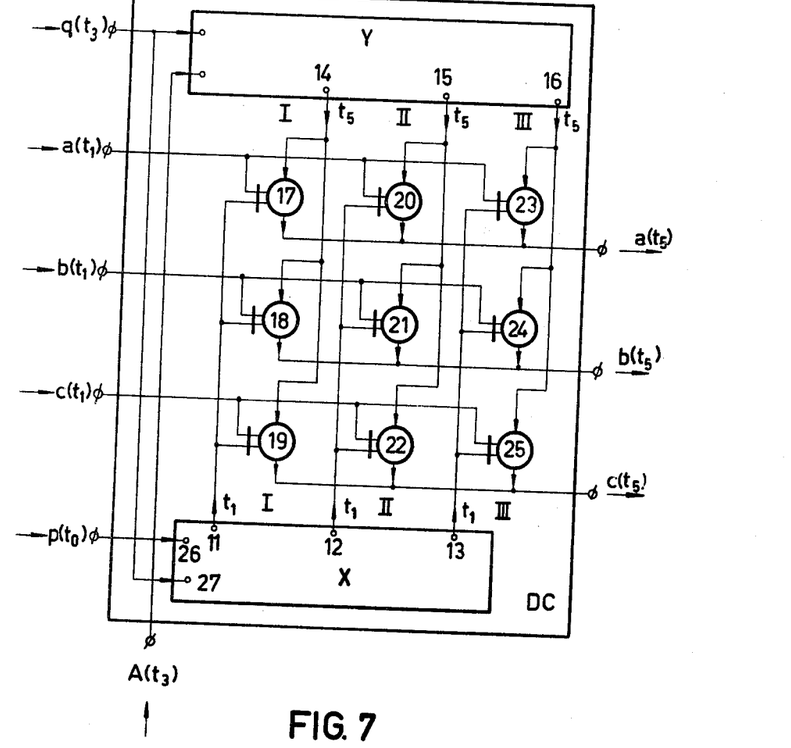
FIG. 7 shows a possible circuit arrangement for the delay member.

FIG. 7 shows a possible embodiment of the delay member. For the sake of simplicity and in agreement with FIG. 1, it is assumed that the code groups each have only three code elements referred to as $a$, $b$ and $c$ and are offered at the instant $t_1$ of the pulse cycles. The delay member comprises two circulating shift registers X and Y, the first shift register delivering pulses at its output terminals 11, 12 and 13 at the instant $t_1$ of every pulse cycle in the sequence 11, 12, 13, 11, 12, 13, 11 . . . while the second register delivers pulses at its output terminals 14, 15 and 16 at the instant $t_5$ of every pulse cycle in the sequence 14, 15, 16, 14, 15, 16, 14 . . . . The shift register X is started by a pulse $p$ occurring at an instant $t_0$ and stopped by a pulse $q$ occurring at an instant $t_3$. The shift register Y is started by a pulse A delivered by the address analyser at an instant $t_3$ and stopped by the pulse $q$. The delay member further comprises three columns I, II and III each comprising three storing pulse generators 17, 18 . . . 25. These pulse generators are cocked in coincidence by the code elements of the incoming code groups and by the pulses delivered by the shift register X, while they are fired by the pulses supplied by the shift register Y.

Operation is as follows. Shortly before the reception of the first code group of a message, the register X receives the pulse $p$ and as a result starts to deliver output pulses from the next instant $t_1$. Hence, the pulse amplifiers of the columns I, II and III are cocked in the sequence I, II, III, I, II, III, I . . . in accordance with the code groups of the message which are received successively, in other words, the said code groups are written in sequence in the columns I, II, III, I, II, III, I . . . . Thus, for example, the first code group of the message, which always is (101), is written in column I, that is to say, the pulse generators 17 and 19 are cocked in coincidence but the pulse generator 18 remains non-cocked. Let it be assumed that the address comprises two code groups. After reception of the second code group, this address is analysed in the address analyser and at the instant $t_3$ of the pulse cycle in which the second code group was offered, the address analyser delivers a pulse A which starts the shift register Y. As a result this shift register begins to deliver output pulses from the instant $t_5$ of the same pulse cycle so that the code groups stored in the colums of the delay member are transmitted.

The cycle of events is as follows:

$t_0$ The pulse $p$ is received; X is started,
$t_1$ the column I is written,
$t_3$ ------,
$t_5$ ------,
$t_1$ the column II is written,
$t_3$ the pulse A is received; Y is started,
$t_5$ the column II is read out,
$t_1$ the column III is written,
$t_3$ ------,
$t_5$ the clumn II is read out,
$t_1$ the column I is written,
$t_3$ ----,
$t_5$ the column III is read out, and so on.

Thus, the delay member DC provides a delay comprising one pulse cycle and four phases of a pulse cycle. If the address comprises three code groups, the following events take place:

$t_0$ the pulse $p$ is received; X is started,
$t_1$ the column I is written,
$t_3$ ------,
$t_5$ ------,
$t_1$ the column II is written,
$t_3$ ------,
$t_5$ ------,
$t_1$ the column III is written,
$t_3$ the pulse A is received; Y is started,
$t_5$ the column I is read out,
$t_1$ the column I is written,
$t_3$ ------,
$t_5$ the column II is read out,
$t_1$ the column II is written,
$t_3$ ----,
$t_5$ the column III is read out, and so on.

The delay member DC now provides a delay comprising two pulse cycles and four phases of a pulse cycle. Consequently, the delay only exceeds the period of time required by the address analyser for completely analysing the address and opening the gates concerned by two phases of the pulse cycles. It will also be seen that a column is never written without previously being read out so that never two code groups can be mixed the one with the other. It will be appreciated that the minimum of number of columns the delay member has to comprise to enable it to perform its function is equal to the maximum number of code groups the address may comprise. The above also shows that the information carried by the signal A consists in the instant at which the pulse constituting this signal occurs, more particularly in the time interval between the instant at which the first code group of the message is received and the instant at which the pulse A occurs.

The address analyser substantially comprises a translator translating the code groups of the address into a 1-out of-$n$ code( in the example given a 1-out-of-7 code) followed by a network of non-storing pulse generators or one shot pulse generators deriving from each pulse delivered by the translator the desired pulses $s_1$ which have to open the gates $G_1$ concerned.

Figure 8:
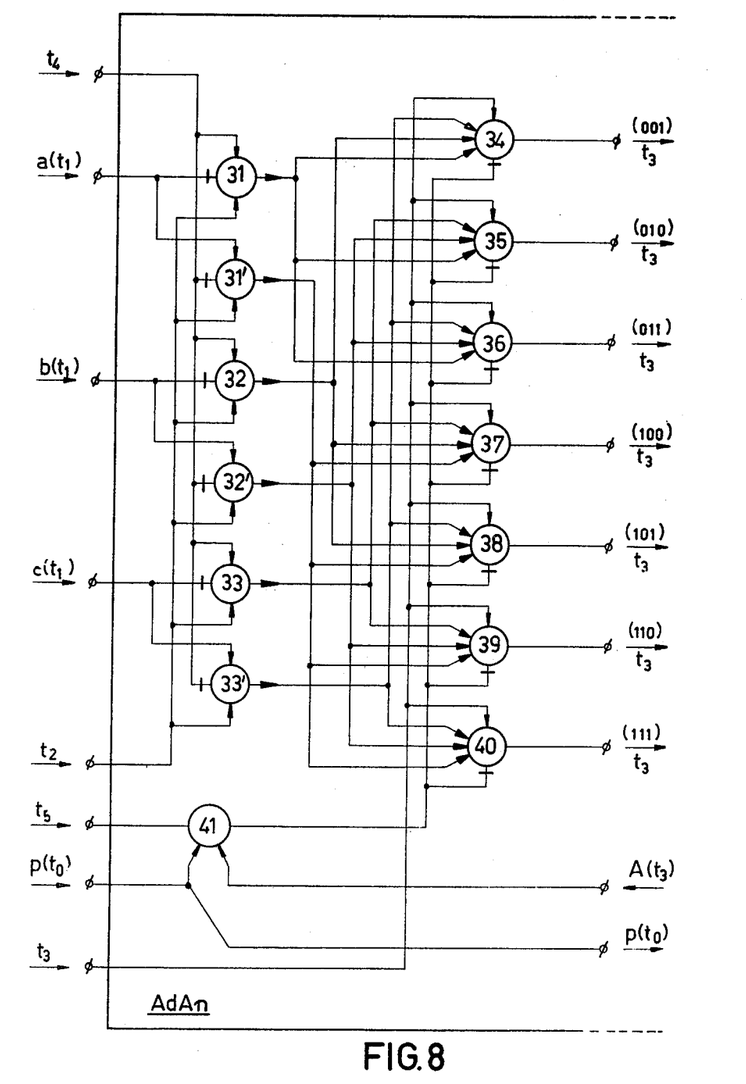
FIGS. 8 and 9 together show a possible circuit arrangement for the address analyser.

FIG. 8 shows a possible embodiment of the translator. This firstly comprises three pairs of storing pulse generators 31 and 31', 32 and 32', 33 and 33', in which the code groups offered at the instant $t_1$ of the pulse cycles are stored. We will now pay special attention to the pulse generators 31 and 31' corresponding wtih the code element $a$. At the instant $t_4$ preceding the instant $t_1$ concerned, the pulse generator 31 was fired and the pulse generator 31' was cocked. If the code element $a$ offered at the instant $t_1$ has the value 0 (no pulse), this condition is maintained. If, however, the code element $a$ has the value 1, the pulse generator 31 is cocked and the pulse generator 31' is fired. If a cocked storing pulse generator is referred to as being in the state 1 and a fired storing pulse generator is referred to as being in the state 0, the pulse generators 31, 32 and 33 immediately after the instant $t_1$ contain the code elements $a$, $b$ and $c$, whilst the pulse generators 31', 32' and 33' contain the negations $\bar{a}$, $\bar{b}$ and $\bar{c}$ of these code elements. At the next instant $t_2$, the pulse generators 31, 31', 32, 32', 33, 33' are all fired so that the information stored in them is transferred to the seven storing pulse generators 34, 35, 36, 37, 38, 39, 40 in the following manner. At the instant $t_5$ preceding the instant $t_1$ concerned, all the pulse generators 34, 35 . . . 40 are cocked. The output terminals of the pulse generators 31, 31' . . . 33, 33' are connected to firing terminals of the pulse generators 34, 35 . . . 40 in such a way that for each of the code groups (001), (010) . . . (111) all the pulse generators 34, 35 . . . 40 but one are fired. For the code group (001) the non-fired pulse generator is the pulse generator 34, for the code group (010) the non-fired pulse generator is the pulse generator 35, and so on. If, for example, the code group offered is (101), immediately after the instant $t_1$ concerned the pulse generators 31, 32' and 33 are cocked and the pulse generators 31', 32 and 33' are fired. At the instant $t_2$ now following only the pulse generators 31, 32' and 33 deliver an output pulse so that the pulse generators 34, 35, 37, 39 and 40 are fired but the pulse generator 38 remains cocked. At the subsequent instant $t_3$, the pulse generators 34, 35 . . . 40 are all fired, but only the pulse generator 38 delivers a pulse. The control pulses which at the instant $t_5$ of the pulse cycles cock all the pulse generators 34, 35 . . . 40 must pass through a gate 41 which receives the pulses $p$ and A and is designed so that it is opened by a pulse $p$ and is closed by a pulse A. Hence, the translator is rendered operative by a pulse $p$ but is again rendered inoperative by a pulse A indicating that the address has been analysed. This latter effect is due to the fact that the pulse generators 34, 35 . . . 40 are no more cocked and consequently cannot deliver output pulses.

Figure 9:
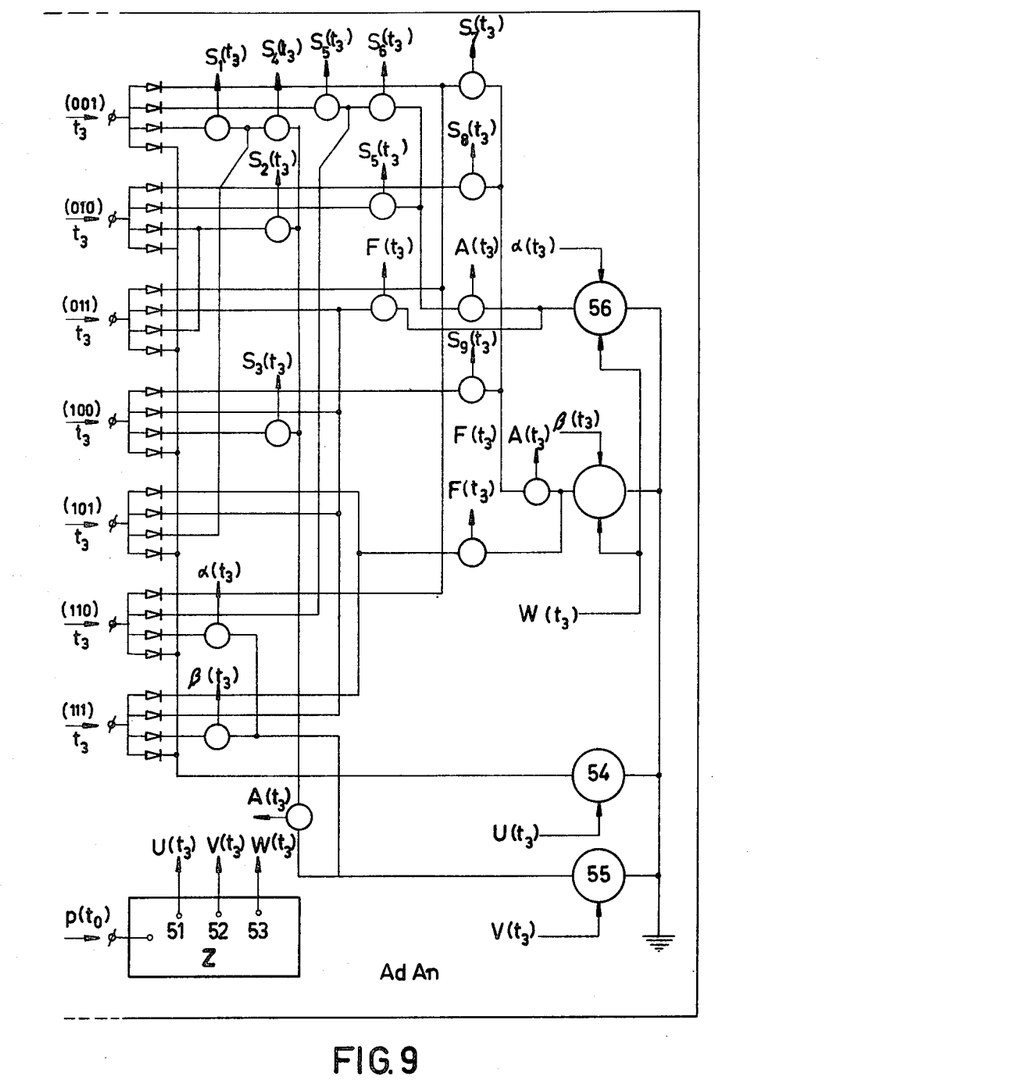

FIG. 9 shows the network of the address analyser and a counter Z or non-circulating shift register Z cooperating therewith. The counter Z receives the pulse $p$ and then delivers pulses at its output terminals, in the sequence 51, 52, 53, at the instants $t_3$ of the three pulse cycles following the instant $t_0$, after which the counter stops automatically because it has finished counting.

The outputs of the translator (FIG. 8) are connected to earth through decoupling diodes and a gate 54 (FIG. 9). The gate 54 is opened for the duration of just one pulse by a pulse U delivered by the terminal 51 of the counter Z at the instant $t_3$ of the first pulse cycle of a message (that is to say, the pulse cycle in which the first code group (101) of the message is offered). Hence, the translation of said first code group made by the translator passes through the gate 54 without any further effect. This is required since this code group, which always is (101), contains no information about the gates $G_1$ to be opened. None of the translations of other code groups made by the translator, however, can pass through the gate 54 since this gate is closed at the instants $t_3$ at which these translations are delivered by the translator. The outputs of the translator, however, are also connected through decoupling diodes to earth through a gate 55. The gate 55 is opened for the duration of one pulse by a pulse V deliverd by the terminal 52 of the counter Z at the instant $t_3$ of the second pulse cycle. The translation of the second rode group, but not the translations of any further code groups, passes through the gate 55. Non-storing pulse generators or one shot pulse generators are connected in the leads to the input of the gate 55 so that the following pulses are produced:

$s_1$, $s_4$, A if the second code group is (001);
$s_2$, A if the second code group is (010);
$s_2$, A if the second code group is (011);
$s_3$, A if the second code group is (100);
$s_4$, A if the second code group is (101);
$\alpha$ if the second code group is (110);
$\beta$ if the second code group is (111).

In the first five cases, the address is completely analysed but in the sixth and seventh case the third code group still has to be analysed. Consequently, in the first five cases the pulse A can be produced in addtion to the pulses $s_i$ concerned, in contradistinction to the last two cases. The pulse $\alpha$ or $\beta$ produced in the last two cases prepares the network for the production of the pulses prescribed by the third code group. For this purpose, the outputs of the translator are also connected, again through decoupling diodes, to earth through a gate 56. The gate 56 is opened for the duration of exactly one pulse by a pulse W delivered by the terminal 53 of the counter Z at the instant $t_3$ of the third pulse cycle, but only if the gate 56 at the instant $t_3$ of the preceding pulse cycle received a pulse $\alpha$. Thus, this gate must have a storing element in contradistinction to the gates 54 and 55 which are non-storing gates. Hence, only the translation of a third code group preceded by the code group (110) as the second code group can pass through the gate 56. A number of non-storing pulse generators are again connected in the leads to the input of this gate so that the following pulses are produced:

$s_5$, $s_6$, A if the third code group is (001);
$s_5$, A if the third code group is (010);
F if the third code group is (011);
F if the code group is (100);
F if the third code group is (101);
$s_6$, A if the third code group is (110);
F if the third code group is (111).

The pulse F may be used as a fault indication since the third code groups (011), (100), (101) and (111) do not constitute an address when combined with (110) as the second code group (see the formulae of FIG. 1). The manner in which the fault indication is further handled has nothing to do with the invention described in this specification and consequently will be left out of consideration. Finally, the outputs of the translator are connected, again through decoupling diodes, to earth through a gate 57 also. The gate 57 is opened, similarly to the gate 56, for the duration of just one pulse by the pulse W, however, in this case only if at the instant $t_3$ of the preceding pulse cycle a pulse $\beta$ was applied to the gate 57. Similarly as to the gate 56, a number of non-storing pulse generators are connected in the leads to the input of the gate 57, however, in this event in agreement with the last five formulae of FIG. 1.

The shift registers X, Y and Z and the gates and pulse generators used in the apparatus described above may be of known types. For the sake of completeness, however, FIGS. 10 to 13 show embodiments of these circuits given by way of example.

Figure 10:
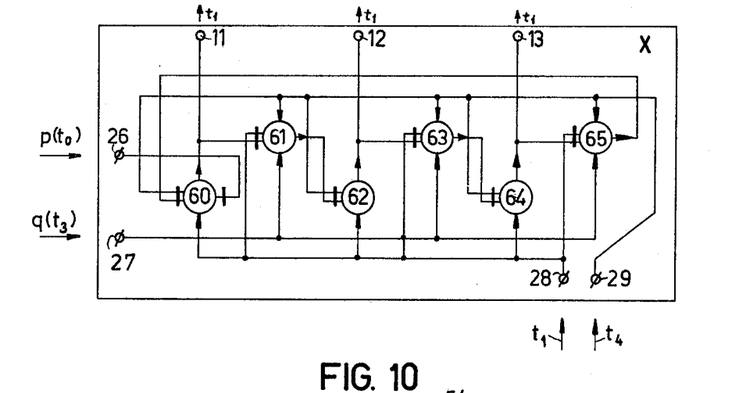
FIG. 10 shows a circuit arrangement of a shift register built up from storing pulse generators.

FIG. 10 shows a possible embodiment of the circulating shift register X comprising a ring of six storing pulse generators 60, 61 . . . 65 which are adapted to be cocked in coincidence. The circuit is fed by a clock pulse generator with clock pulses which occur at the instants $t_1$ and $t_4$ of the pulse cycles and are applied to supply terminals 28 and 29. The circuit further includes a terminal 26 to which a pulse $p$ may be applied at an instant $t_0$ and a terminal 27 to which a pulse $q$ may be applied at an instant $t_3$. The circuit arrangement operates as follows. It is assumed that all the pulse generators are in the non-cocked condition. When the circuit receives a pulse $p$, the pulse generator 60 is cocked. This pulse generator is fired at the subsequent instant $t_1$ so that the pulse generator 61 is cocked in coincidence and the output terminal 11 delivers an output pulse. At the subsequent instant $t_4$, the pulse generator 61 is fired so that the pulse generator 62 is cocked in coincidence. The clock pulse occurring at the next intsant $t_1$ causes the pulse generator 62 to be fired so that the purse generator 63 is cocked in coincidence and the output terminal 12 delivers an output pulse. Thus, the output terminals 11, 12, 13, 11, 12, 13, 11 . . . deliver output pulses in sequence. If at the instant $t_3$ of a pulse cycle a pulse $q$ is received by the circuit, the cocked one of the pulse generators 61, 63, 65 is fired, however, this does not cause the next pulse generator in the ring to be set to the cocked condition since there is no coincidence at the cocking terminals of this latter pulse generator. All the pulse generators now are in the non-cocked condition and the circuit can no longer deliver any output pulses. The shift registers Y and Z may be designed similarly.

Figure 11:
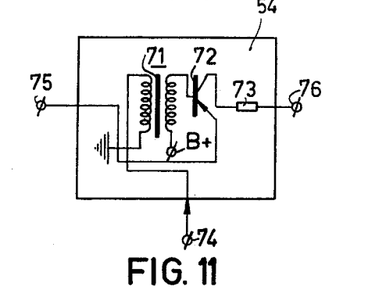
FIG. 11 shows the circuit arrangement of a non-storing pulse gate.

FIG. 11 shows a possible embodiment of the non-storing gates 54 and 55. The gate comprises a transformer 71, a pnp-transistor 72 and, as the case may be, a current-limiting resistor 73. One end of the primary of the transformer 71 is connected to earth and the other end is connected to a control terminal 74. One end of the secondary of the transformer is connected to a positive voltage source $B_+$ while the other end is connected to the base of the transistor 72. The emitter of the transistor 72 is connected to an input terminal 75 and its collector is connected through the resistor 73 to an output terminal 76 of the gate. This circuit operates as follows. Normally, the transistor is cut off, since its base is positively biased by the voltage source $B_+$. However, if a pulse of a certain polarity is applied to the control terminal 74, a voltage is induced in the secondary of the transformer 71 and the arrangement is such that this voltage drives the base of the transistor 72 negative so that the transistor becomes conductive. Hence, the gate is opened, but only for the time during which the base of the transistor 72 is negative, that is to say, during the time in which a magnetic field is being built up in the core of the transformer 71.

Figure 12:
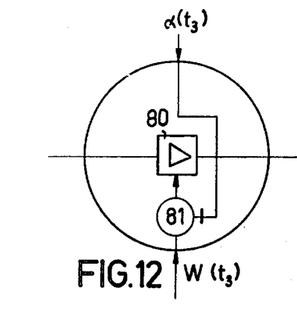
FIG. 12 shows the circuit arrangement of a storing pulse gate.

FIG. 12 shows a possible embodiment of the storing gate 56 (FIG. 9). This gate comprises a non-storing gate 80 of the type shown in FIG. 11 and a storing pulse generator 81. If at the instant $t_3$ of a pulse cycle a pulse $\alpha$ occurs, the storing pulse generator 81 is cocked. If at the instant $t_3$ of the next pulse cycle the gate receives a pulse W, the pulse amplifier 81 is fired and its output pulse opens the gate 80 for the duration of exactly one pulse.

Figure 13:
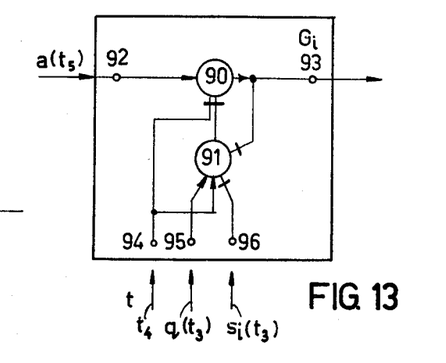
FIG. 13 shows the circuit of an alternative arrangement storing pulse gate.

Finally, FIG. 13 shows a possible embodiment of the gates $G_i$ (FIG. 1). The circuit arrangement shown in FIG. 13 has an input terminal 92 which at the instants $t_5$ receives one of the code elements of the code groups, for example the code element $a$, an output terminal 93, a supply terminal 94 which at the instant $t_4$ of the pulse cycles receives a clock pulse from the clock pulse generator, a control terminal 95 which at the instant $t_3$ of a pulse cycle may receive a pulse $q$, and a control terminal 96 which at the instant $t_3$ of a pulse cycle may receive a pulse $s_i$. The gate further contains two storing pulse generators 90 and 91, the former having two coupled cocking terminals and the latter having two uncoupled cocking terminals. This circuit operates as follows. It is assumed that both pulse generators are in the non-cocked condition. Thus, neither pulse generator can deliver output pulses nor can they cock each other. Hence, this state is stable and, since the output terminal 93 delivers no output pulses, the gate is closed. If, however, at the instant $t_3$ of a pulse cycle the gate receives a pulse $s_i$, the pulse generator 91 is cocked. At the subsequent instant $t_4$ this pulse generator is fired and the pulse generator 90 is cocked in coincidence. However, the latter delivers an output pulse when the code element $a$ received has the value 1 so that the pulse generator 91 is again cocked and the whole cycle is repeated. Consequently, this state also is stable and since the output terminal 93 now delivers output pulses, the gate is opened. If, however, after some time at the instant $t_3$ of a pulse cycle a pulse $q$ is received, the pulse generator 91, which is cocked at this instant, is fired but this does not result in the pulse generator 90 being cocked, since there is no coincidence. Thus, both pulse generators are again in the non-cocked condition, in other words, the gate is again closed.

Hereinbefore it was assumed that the addresses of the messages consist of different numbers of code groups and that the delay period of the delay member depends upon the length of the address. This provides a reduction of the delay produced by the transfer. It will, however, be appreciated that the delay member may alternatively have a constant delay period which obviously must be tuned to the longest address. In this case, the pulse A starting the shift register Y (FIG. 7) may be derived from the pulse delivered by the terminal 13 of the register X. It is further assumed that the apparatus described is built up from components reacting to current. Obviously, it may alternatively be built up from components responding to voltage. In the first case, series circuits and in the second case parallel circuits are preferably used. Since parallel circuits can be shown in circuit diagrams far more readily, the drawings everywhere show parallel circuits, even where series circuits will have to be used in actual fact.

What is claimed is:

1. In a system for receiving information signals of the type having an address portion in coded digital form and for selectively transmitting said information signals to a plurality of output channels in response to said address portion, a plurality of gate means each having an output terminal connected to a separate output channel, an input terminal, and a control terminal, delay means, means applying said information signals to said delay means, means applying the output of said delay means to the input terminals of said gate means, address analyzer means, and means applying said information signals to said address analyzer means, said address analyzer being reponsive to said address portion to selectively apply control signals to said control terminals whereby said gate means are selectively opened, said address analyzer being unresponsive to further portions of said information signals, the delay of said delay means being sufficient that said information signals are applied to said input terminals only when said address analyzer has completely analyzed said address portion and opened the selected gates, said delay means comprising a plurality of columns of storing pulse generators each having a pair of coupled cocking terminals, a firing terminal, and an output terminal, first circulating shift register means for applying pulses sequentially to said columns of pulse generators whereby a pulse is simultaneously applied to one cocking terminal of all of the pulse generators of each column, means applying said information signals to the other cocking terminals of said pulse generators whereby said information signals are stored sequentially in said columns, and means for sequentially applying information signals stored in said columns to the input terminals of said gate means by way of the output terminals of said pulse generators.

2. The system of claim 1, in which said means for sequentially applying information signals stored in said columns comprises a second circulating shift register for sequentially applying firing pulses to said columns whereby firing pulses are simultaneously applied to the firing terminals of the pulse generators of each column.

3. The system of claim 2, in which said first and second circulating shift registers each have a starting terminal and a stopping terminal, said information signals have a start pulse and a stop pulse, and said address analyzer comprises means for providing an address analyzer pulse upon completion of the analyzing of said address portion, comprising means applying said start pulse to the starting terminal of said first shift register, means applying said address analyzer pulse to the starting terminal of said second shift register, and means applying said stop pulse to the stopping terminals of said first and second shift registers.

4. In a system for receiving information signals of the type having an address portion in coded digital form, and for selectively transmitting said information signals to a plurality of output channels in response to said address portion, a plurality of gate means each having an output terminal connected to a separate output channel, an input terminal, and a control terminal, delay means, means applying said information signals to said delay means, means applying the output of said delay means to the input terminals of said gate means, address analyzer means, and means applying said information signals to said address analyzer means, said address analyzer comprising means for translating said address portion to 1-out-of-$n$ code signals, a plurality of pulse generators for providing control pulses, means applying said control pulses to separate said gate means, non-circulating shift register means for providing a sequence of gate opening pulses, a plurality of gate circuits, means for applying said gate opening pulses to separate gate circuits, means serially connecting said pulse generators with said gate circuits to form a plurality of networks and for applying said 1-out-of-$n$ code signals to said networks whereby said pulse generators are selectively energized to provide said control pulses and thereby said gate means are selectively opened, means for making said address analyzer unresponsive to further portions of said information signals, the delay of said delay means being sufficient that said information signals are applied to said input terminals only when said address analyzer has completely analyzed said address portion and opened the selective gates.

5. The system of claim 4, in which said information signals include a start pulse, said address portion is in the form of simultaneous pulsatory signals on a plurality of input conductors, and said means for translating said address portion comprises a plurality of first storing pulse generators each having at least a cocking terminal, two firing terminals, and output terminal means, a plurality of second storing pulse generators each having a plurality of firing terminals, a cocking terminal, and an output conductor, means connecting each input conductor to the cocking terminal of one first pulse generator and the firing terminal of another first pulse generator whereby a separate pair of first pulse generators corresponds to each input conductor, means for firing said one first pulse generator and for cocking said other first pulse generator of each pair prior to the occurrence of said address portion, means for simultaneously firing all of said first pulse generators subsequent the occurrence of said address portion, mean for simultaneously cocking all of said second pulse generators, and means for connecting said output terminal means to the firing terminals of said second pulse generators in a predetermined order, whereby a 1-out-of-$n$ code is provided on said output conductors.

6. The system of claim 5, in which said address analyzer comprises means for providing an end pulse when said address analyzer has completely analyzed said address portion, said means for cocking said second pulse generators comprising gate means having first, second, third and fourth terminals and being arranged to pass signals between said first and second terminals when a pulse has previously been applied to said third terminal and to inhibit the passage of signals between said first and second terminals when a pulse has been previously applied to said fourth terminal, means applying said start pulse to said third terminal, means applying said end pulse to said fourth terminal, means connecting said second terminal to said cocking terminals of said second pulse generators, and means for applying a pulse to said first terminal subsequent said start pulse and prior to said address portion, whereby said second pulse generators are not cocked after an address portion has been analyzed.

7. The system of claim 4, in which said information signals have a start pulse, said non-circulating shift register has a start terminal and a plurality of first output terminals, means applying said start pulse to said start terminal whereby said gate opening pulses are sequentially provided at said first output terminals, said gate circuits each having a gate opening terminal, and means connecting said first output terminals to separate gate opening terminals.

8. The system of claim 4, in which said 1-out-of-$n$ code is in the form of the occurrence of a pulse on one of a plurality of address code conductors, comprising separate diode means connecting each of said address code conductors to each of said networks, and end pulse generator means connected in at least one of said networks, whereby an end pulse is generated when said address portion has been completely analyzed.

References Cited by the Examiner

UNITED STATES PATENTS

| | | | |
|---|---|---|---|
| 2,670,463 | 2/1954 | Raymond et al. | 340—147 |
| 2,799,449 | 7/1957 | Turing et al. | 340—172.5 |
| 2,854,652 | 9/1958 | Smith | 340—172.5 |
| 2,872,666 | 2/1959 | Greenhalgh | 340—172.5 |
| 2,946,044 | 7/1960 | Bolgiano et al. | 340—172.5 |
| 2,952,731 | 9/1960 | Wright et al. | 340—172.5 |
| 2,986,723 | 5/1961 | Darwin et al. | 340—147 |
| 3,001,176 | 9/1961 | Ingram | 340—147 |
| 3,081,445 | 3/1963 | Rogal | 340—172.5 |
| 3,093,814 | 6/1963 | Wagner et al. | 340—172.5 |

ROBERT C. BAILEY, *Primary Examiner.*

NEIL C. READ, MALCOLM A. MORRISON,
*Examiners.*